Figure 1:
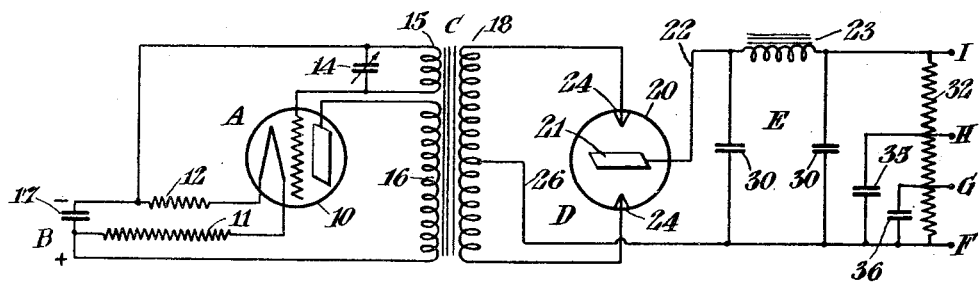

Sept. 15, 1931.  B. F. MIESSNER  1,823,837

METHOD OF AND APPARATUS FOR CHANGING VOLTAGE

Filed March 21, 1927

Inventor
Benjamin F. Miessner

By Attorney

Patented Sept. 15, 1931

1,823,837

UNITED STATES PATENT OFFICE

BENJAMIN F. MIESSNER, OF SOUTH ORANGE, NEW JERSEY, ASSIGNOR, BY MESNE ASSIGNMENTS, TO RADIO CORPORATION OF AMERICA, OF NEW YORK, N. Y., A CORPORATION OF DELAWARE

METHOD OF AND APPARATUS FOR CHANGING VOLTAGE

Application filed March 21, 1927. Serial No. 176,842.

This invention relates generally to voltage changer devices, and more particularly to a device of this character which may be employed in conjunction with 3-electrode vacuum tube signal receiving systems, now in use, as a substitute for the batteries or other circuit energizing devices now employed. The invention also relates to vacuum tube signal systems in which there is embodied an improved means for energizing one or more of the vacuum tube circuits.

One of the important objects of my invention is to provide a means for supplying a steady direct current at comparatively high voltage to the plate circuit of a high voltage power tube and utilizing for this purpose the energy derived from a comparatively low voltage direct current source, such as, for example, the usual 110 volt direct current lighting mains. Certain power tubes now in use are designed for operation at a plate voltage as high as 400 and, where batteries are employed for supplying such high voltage, the cost of energy supplied is not only excessive, but the batteries themselves, being large and heavy, occupy a large amount of space. The batteries, when exhausted, may be renewed only at considerable inconvenience.

These various disadvantages are overcome by the use of the apparatus constructed in accordance with my invention. The cost of current supplied by the use of such apparatus is negligible as compared with the cost of such current when supplied by batteries. Furthermore, such apparatus is simple and compact in construction, is inexpensive to manufacture, and is durable and highly efficient in use.

In carrying out my invention the current from the direct current source is converted into an oscillatory current preferably by means of a vacuum tube oscillator. The voltage of the oscillatory current is raised by a transformer and the high voltage alternating current delivered by the transformer is rectified and passed through a suitable filtering device so as to smooth out any ripples or variations in the rectified current. The frequency of the oscillatory current produced by the vacuum tube oscillator is preferably above normal effective audible frequency and thus sufficiently high that any variations or ripples appearing at this frequency in the rectified current which are carried over into the amplifier tube circuits will not produce a disturbing hum in the telephones. Furthermore, the frequency of the oscillatory current is preferably so selected that current variations or ripples in the rectified current in the amplifier tube circuits will not combine with the carrier signal waves to produce audible hum. By employing an oscillatory current of relatively high frequency it is possible to make use of a transformer of relatively small windings for raising the voltage. For the same reason the impedance coils and condensers employed in the filter may be comparatively small as compared with those which would be required were the oscillatory current of low frequency.

Figure 2:
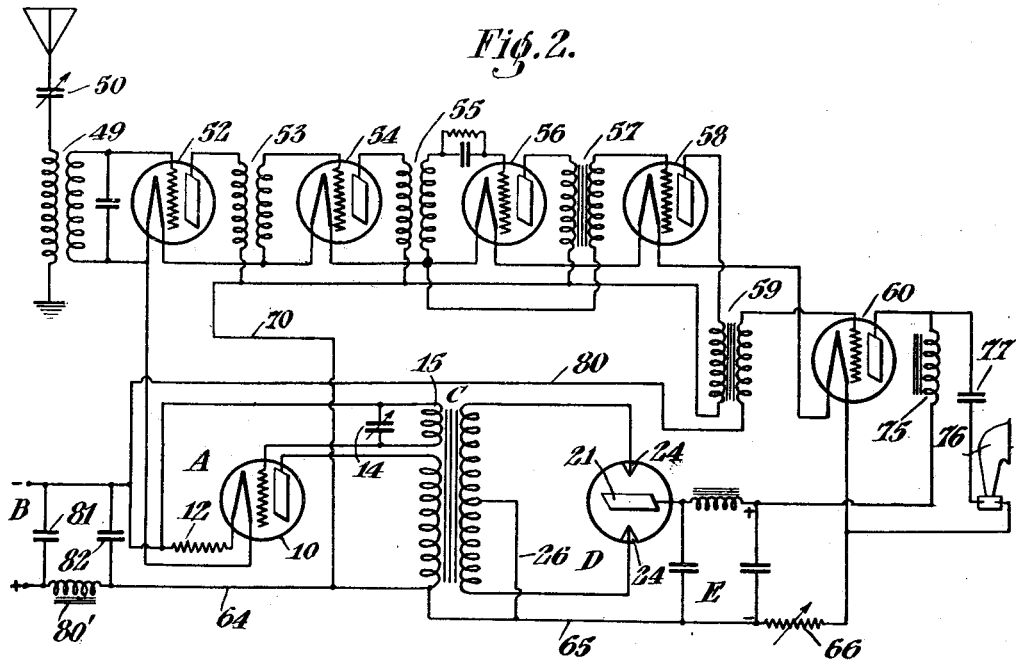

Other objects and advantages of my invention will appear from the following description taken in connection with the accompanying drawings, wherein, Fig. 1 is a circuit diagram of an apparatus for supplying the desired high voltage from comparatively low voltage direct current lighting mains, the apparatus shown being adapted for application to existing radio receiving sets in lieu of the usual so-called B-batteries. Fig. 2 is a circuit diagram of a multi-stage radio receiving system embodying a slightly modified form of my invention, and wherein all of the tube circuits except the final one are supplied directly from the comparatively low voltage direct current mains.

Referring more particularly to Fig. 1, the vacuum tube oscillator A is energized with current from the lighting mains B and serves to generate an oscillatory current at a frequency of approximately 5000 to 10,000 cycles, and to supply such current to the primary winding of a step-up transformer C. The alternating current delivered from the secondary of transformer C at relatively high voltage is rectified by a vacuum tube rectifier D. The rectified current is smoothed out by a filter E, and from the filter is supplied to the various consuming circuits through a negative lead F and leads G, H and I of different positive potential.

The oscillator A comprises a vacuum tube 10 of high plate current capacity. The filament of tube 10 is energized from the mains B through a high resistance 11 and low resistance 12. These resistances serve to reduce the voltage of the mains B to the voltage carried by the filament of the tube 10. The resistance 12 has the further function of providing a negative bias on the grid of the oscillator tube the grid being connected conductively to the negative main through the inductive coil 15. The plate of tube 10 is connected to the negative main through a coil 16 which forms part of the primary winding of transformer C. Coil 16 is in inductive relation to coil 15 and also to the secondary winding 18 of transformer C.

In operation the tube 10 and coupled plate and grid circuits operate as a generator of oscillations. The tube receives its energy from supply mains B and the oscillatory currents in coils 15 and 16 serve to induce an alternating current of the same frequency in the secondary winding 18 of transformer C. This frequency can be varied by adjustment of condenser 14 in a manner well known in the art and in practice the frequency will be adjusted relative to the frequency of the incoming signal carrier waves so that there would be no danger of the occurrence of audible beats in the telephones or loud speaker. I preferably connect a condenser 17 across the direct current mains B. This condenser acts as a by-pass for the oscillatory current in the plate circuit of tube 10 so that this current, instead of flowing between the coil 16 and filament by way of the high resistance 11 or back through the mains B, flows through condenser 17 and the low resistance 12.

The rectifier D as shown comprises a tube 20 having a cold cathode 21 connected to the output lead I through conductor 22 and inductance 23 of the filter E and also having two anodes 24 which are connected respectively to opposite terminals of the secondary winding 18. The mid-point of the secondary winding 18 is connected to the negative output lead F by a conductor 26. While the tube 20 as shown is of the type which does not require a heated cathode, it is obvious that in certain cases rectifier tubes of the heated filament cathode or other types may be employed if desired. In operation the rectifier serves to deliver a unidirectional current which passes through conductor 22 and returns through conductor 26 and thence through the upper or lower half of secondary winding 18.

The current delivered by the rectifier D, while unidirectional in character, is pulsating and the purpose of filter E is to smooth out this pulsating current so that the current delivered to the consuming circuits will be substantially steady. For this purpose I employ the inductance 23 and condensers 30, the condensers being connected across the rectifier output circuit at opposite sides of the inductance 23. The operation of inductance 23 and condensers 30 in smoothing out the rectified current is well known in the art and no detailed description of such operation is thought necessary. For the purpose of supplying certain of the consuming circuits with current at less voltage than the total output voltage of the rectifier, I connect across the output circuit a resistance 32 and from intermediate points of this resistance I connect the lower voltage output leads H and G. Between lead H and negative lead F, I connect a condenser 35, and similarly between lead G and negative lead F, I connect a condenser 36. These condensers act in a manner similar to condensers 30 to smooth out ripples or variations in the direct current supplied from the leads H and G, and such condensers also act to form a by-pass around portions of the resistance 30 for any high frequency signaling currents in the circuits supplied from the leads H and G.

The apparatus shown diagrammatically in Fig. 1 may be used as a so-called "B-battery" substitute in existing radio receiving sets. When the set includes plate circuits which are designed to be energized at different voltages leads H and G may be employed as well as lead I. It is clear that if desired, leads H and G may be adjusted to different points along the resistance 32 so as to give the voltages desired. It is obvious that by employing a step-down transformer in place of the step-up transformer C, the arrangement shown in Fig. 1 may be employed for supplying current to the consuming circuits at voltages which are less than the voltage of mains B.

In Fig. 2, I show a simplified circuit diagram of a radio receiving system employing two stages of radio frequency amplification, a detector stage and two stages of audio frequency amplification. Each of these stages comprises a three-electrode vacuum tube. The filament, grid and plate circuits of all of the tubes, except the plate circuit of the tube in the last audio frequency stage are energized directly from the direct current mains B. The plate circuit of the tube in the last stage of audio frequency amplification which, in the system shown, is designed to be operated at higher voltage than the plate circuits of the remaining tubes, is energized indirectly from the direct current mains B through a voltage raising device or booster similar to that shown in Fig. 1.

In Fig. 2, 50 represents the antenna circuit which is inductively coupled to the grid of the radio frequency amplifying tube 52 through the radio frequency transformer 49. The plate circuit of tube 52 is inductively coupled through radio frequency transformer 53 to the grid circuit of vacuum tube 54, which forms the second radio frequency stage amplifier. 56 represents the detector tube, the grid circuit of which is inductively coupled by transformer 55 to the output circuit of tube 54. The plate circuit of detector tube 56 is inductively coupled through transformer 57 to the grid circuit of tube 58, which forms the first audio frequency stage amplifier. The power tube 60 is the second or last stage of audio frequency amplification and has its grid circuit inductively coupled by transformer 59 to the plate circuit of tube 58. The translating device or loud speaker 76 is connected across the output of the power tube 60 in series with the condenser 77. For the sake of simplicity I have omitted from Fig. 2 the tuning condensers and other devices customarily employed in the several tube circuits to secure operation of selective amplification and detection. However, it will be understood that devices of this character may be used as required in receivers as actually built.

In the form of invention illustrated in Fig. 2 the filaments of all the tubes are supplied in series from the mains B, and the plate circuits of tubes 52, 54, 56 and 58 are also energized directly from the mains B. To lessen fluctuations in the current such, for example, as variations due to commutation at the direct current generator, I employ a filtering device, which consists of an inductance 80' in series with the positive main and condensers 81 connected across the mains at opposite sides of the inductance 80'. This filtering device has the effect of causing the current supplied to the filament heating circuits and to the plate circuits of tubes 52, 54, 56 and 58 to be substantially steady in character.

The filament heating circuit for all of the tubes may be traced from the positive main through inductance 80', conductors 64, 65, resistance 66, filaments of tubes 60, 58, 56, 54, 52 and 10, grid biasing resistance 12 to the negative main. Resistance 66 has the effect of reducing the voltage of the mains to that required for operation of the filaments in series. If desired, each of the filaments may be shunted by an adjustable resistance to control the current through the filament.

The plate circuits of tubes 52, 54, 56 and 58 are connected across the supply mains in parallel with each other. Each of these circuits may be traced from the positive main through inductance 80', conductor 70, thence through the particular transformer primary located in such circuit to the plate, and thence to the filament and through the filament supply circuit to the negative main.

The plate circuit of power tube 60 is supplied at relatively high voltage through the current boosting device similar to that shown in Fig. 1. The plate circuit of tube 60 is connected across the filter E of the boosting device and this circuit includes the reactance 75 in the lead to the plate and the resistance 66 in the lead to the filament. The loud speaker 76, as previously stated, is connected between the filament and plate of tube 60, and the condenser 77, which is in the loud speaker circuit, serves to prevent the passage through the loud speaker of direct current from the filter E. As the various parts of the voltage boosting device are similar to corresponding parts of this device shown in Fig. 1, these parts are given the same reference characters. The grid of tube 52 is connected to the filament of tube 52 through the secondary of transformer 49. Grid of tube 54 is connected to the filament of tube 54 through the secondary of transformer 53, and a similar connection is made for the grid of tube 56. Grid of tube 58 is connected through the secondary of transformer 57 to the filament supply circuit at a point in such circuit between the filaments of tubes 54 and 56. This connection gives the grid of tube 58 a negative bias approximately equal to the resistance drop across the filament of tube 56.

The grid of tube 60 is connected through the secondary of transformer 59 and through conductor 80 to the negative terminal of supply mains B. The grid of tube 60 may therefore be given a negative bias equal to the entire voltage of the supply mains B. A type of power tube now commercially available operates at a plate voltage of 400 and a negative grid bias of substantially 110. Such a tube may be advantageously employed as the power tube 60 in the system shown in Fig. 2, wherein the mains B are the usual 110 volt lighting mains and the voltage booster receives current from such mains and delivers direct current at approximately 400 volts to the plate circuit of power tube 60.

Tracing the plate supply for the tube 60 from the 110 volt direct current source B, the current passes thru lead 64, lead 26, the two halves of the secondary of transformer C in parallel, the rectifier D, the positive side of filter E, the reactance 75, plate-cathode path of tube 60 and thence thru the filaments of tubes 58, 56, 54, 52 and 10 and resistance 12 to the negative side of the source. Variable resistance 66 is in parallel with the portion of this path constituted by lead 26, rectifier D, reactance 75 and plate-cathode path of tube 60. Accordingly, the voltage drop across resistance 66 is impressed on the last mentioned part of the circuit and, therefore, on the plate of tube 60. In addition to voltage impressed upon the plate of tube 60 from the 110 volt direct current source B, voltage is impressed on this tube by oscillator A and rectifier D in the manner heretofore clearly explained.

While I have shown the several tube filaments as heated from the direct current mains B, it is obvious that I may, if desired, employ batteries for this purpose.

I claim:—

1. In a signal receiving system having a plurality of vacuum tube repeaters, the plate circuit of one of said repeaters being designed for operation at voltage higher than the plate circuit of another of said repeaters, means for supplying said high voltage plate circuit with direct current from a source of direct current of lower voltage comprising means energized from said source for producing an oscillatory current, a transformer supplied from said last named means, a rectifier supplied from said transformer, and connections including a filter system from the output circuit of said rectifier to said high voltage plate circuit, and connections from said source to the plate circuit of said other repeater for supplying current directly thereto.

2. In a signal receiving system, a plurality of vacuum tube repeaters, having plate and filament heating circuits, the plate circuit of one of said repeaters being designed for operation at higher voltage than the plate circuit of another of said repeaters, means for supplying said high voltage plate circuit with direct current from a source of direct current of lower voltage, comprising means energized from said source for producing an oscillatory current, a transformer supplied from said last named means, a rectifier supplied from said transformer, and connections from the output of said rectifier to said high voltage plate circuit, and connections from said source to said filament heating circuit and to the plate circuit of said other repeater for supplying current directly thereto.

3. In a signal receiving system, a plurality of three electrode vacuum tube repeaters having grid, plate and filament heating circuits, one of said repeaters being designed to have its plate circuit operated at higher voltage than the plate circuit of another of said repeaters, a single source of direct current energy of lesser voltage than the designed higher plate operating voltage of said tube, connections for energizing the circuits of said tubes except said higher operating voltage plate circuit directly from said single source, and means for supplying higher voltage direct current to said plate circuit comprising a three electrode vacuum tube oscillator having all of its circuits energized from said single source, a transformer supplied by said oscillator, a rectifier supplied from said transformer, and connections including a filter from the output of said rectifier to said higher voltage plate circuit.

4. In a booster for direct electrical potential, the combination of a source of direct current, a vacuum tube oscillator connected thereto, means for rectifying the output current of said oscillator, and means for adding the potential of the rectified current to the potential of said source.

5. In a booster for direct electrical potential, the combination of a source of direct current, an oscillator energized by energy from said source, a transformer, the primary of which is included within the output circuit of said oscillator, the secondary of said transformer being connected to one terminal of said source, and a rectifier connected across the terminals of said secondary, an output terminal of said rectifier and the other terminal of said source constituting a connection for supplying direct current at a potential higher than that of said source.

6. In a booster for direct electrical potential, the combination of a source of direct current, a vacuum tube oscillator energized by energy from said source, a transformer, the primary of which is included within the output circuit of said oscillator, the mid-point of the secondary of said transformer being connected to one terminal of said source, and a full-wave rectifier connected across the terminals of said secondary, an output terminal of said rectifier and the other terminal of said source constituting a connection for supplying direct current at a potential higher than that of said source.

7. In a booster for direct electrical potential, the combination of a source of direct current, a vacuum tube oscillator energized by energy from said source, a transformer, the primary of which is included within the output circuit of said oscillator, the secondary of said transformer being connected to one terminal of said source, a rectifier connected across the terminals of said secondary, and a filter across the output terminals of said rectifier, one of the terminals of said filter and the other terminal of said source constituting a connection for supplying direct current at a potential higher than that of said source.

8. In a booster for direct electrical potential, the combination of a source of direct current, a vacuum tube oscillator energized by energy from said source, a transformer, the primary of which is included within the output circuit of said oscillator, the mid-point of the secondary of said transformer being connected to one terminal of said source, a full-wave rectifier connected across the terminals of said secondary, and a filter across the output terminals of said full-wave rectifier, one of the terminals of said filter and the other terminal of said source constituting a connection for supplying direct current at a potential higher than that of said source.

9. In a booster for direct electrical potential, the combination of a source of direct current, a vacuum tube oscillator energized by energy from said source for the production of an alternating current, the frequency of which is higher than that of usual audible frequencies, a transformer, the primary of which is included within the output circuit of said oscillator, the mid-point of the secondary of said transformer being connected to the high potential terminal of said source, a full wave rectifier connected across the terminals of said secondary, and a filter connected across the output terminals of said full-wave rectifier, the high potential terminal of said filter and the low potential terminal of said source serving to supply direct current at a potential higher than that of said source.

10. In a booster for direct electrical potential, the combination of a source of direct current, a vacuum tube oscillator energized by energy from said source for the production of an alternating current, the frequency of which is higher than that of usual audible frequencies, a transformer, the primary of which is included within the output circuit of said oscillator, the secondary of said transformer being connected to the positive terminal of said source, a rectifier connected across the terminals of said secondary, and a filter circuit connected across the output terminals of said rectifier, the positive terminal of said filter and the negative terminal of said source constituting output terminals for direct current at higher potential than that of said source.

11. The method of boosting the potential of a source of direct current which consists in producing an alternating current from said source, rectifying said alternating current to produce a direct current, and adding the potential of said direct current to the voltage of said source.

12. The method of boosting the potential of a source of filtered direct current which consists in producing an alternating current from said current, rectifying said alternating current, filtering said rectified current, and adding the potential of said filtered rectified current to the potential of said filtered direct current.

13. The method of boosting the potential of a source of direct current which consists in producing from said source an alternating current of a frequency higher than that of average audible frequency, rectifying said alternating current, and adding the potential of said rectified current to the voltage of said source.

14. In an amplifying circuit having at least one vacuum tube repeater, a source of direct current, a vacuum tube oscillator connected thereto and adapted to be energized thereby, means for rectifying the output current of said oscillator, and means for adding the potential of the rectified current to the potential of said source for energizing said repeater.

15. In an amplifier, a vacuum tube repeater comprising an anode, a control electrode and a cathode, a source of direct current, a vacuum tube oscillator connected thereto and adapted to be energized thereby for the production of oscillatory currents, means for rectifying the output current of said oscillator, and means for adding the potential of the rectified current to the potential of said source for maintaining said anode at a positive potential relative to the control electrode greater than the potential of said rectified current.

16. In an amplifier, a vacuum tube repeater comprising an anode, a control electrode and a cathode, means for energizing said repeater comprising a source of direct current, a vacuum tube oscillator connected thereto and adapted to be energized thereby for the production of oscillatory currents, means for rectifying the output current of said oscillator, and means for adding the potential of the rectified current to the potential of said source for maintaining said anode at a positive potential relative to the control electrode substantially equal to the sum of the potential of the rectified current and the potential of said source.

17. In an amplifier, a vacuum tube repeater comprising an anode, a control electrode and a cathode, means for energizing said repeater comprising a source of direct current, a vacuum tube oscillator connected to said source adapted to be energized thereby for the production of oscillatory currents, means for rectifying the output current of said oscillator and means for adding the potential of the rectified current to the potential of said source for maintaining said anode at a positive potential relative to the control electrode substantially equal to the sum of the potentials of the rectified current and said source, and means for maintaining said anode at a positive potential relative to said cathode which is greater than the potential of the rectified current.

18. In an amplifier, a vacuum tube repeater comprising an anode, a control electrode and a cathode, means for energizing said repeater comprising a source of direct current, a vacuum tube oscillator connected thereto and adapted to be energized thereby for the production of oscillatory currents, means for rectifying the output current of said oscillator and means for adding the potential of the rectified current to a portion of the potential of said source for maintaining said anode at a positive potential relative to the cathode greater than the potential of the rectified current and the control electrode at a negative potential relative to the cathode less than the potential of said source.

In testimony whereof I hereunto affix my signature.

BENJAMIN F. MIESSNER.